US008926001B2

(12) United States Patent
Ballarin et al.

(10) Patent No.: US 8,926,001 B2
(45) Date of Patent: Jan. 6, 2015

(54) VEHICLE HAVING A DEFORMABLE ROOF FOR AERODYNAMICS IMPROVEMENT

(75) Inventors: Paolo Ballarin, Saint Genis Laval (FR); Thomas Reiche, Longes (FR)

(73) Assignee: Renault Trucks, St. Priest (FR)

( * ) Notice: Subject to any disclaimer, the term of this patent is extended or adjusted under 35 U.S.C. 154(b) by 0 days.

(21) Appl. No.: 13/641,136

(22) PCT Filed: Jul. 22, 2010

(86) PCT No.: PCT/IB2010/002152
§ 371 (c)(1),
(2), (4) Date: Oct. 15, 2012

(87) PCT Pub. No.: WO2012/010922
PCT Pub. Date: Jan. 26, 2012

(65) Prior Publication Data
US 2013/0187405 A1 Jul. 25, 2013

(51) Int. Cl.
*B62D 35/00* (2006.01)
(52) U.S. Cl.
CPC ................................... *B62D 35/001* (2013.01)
USPC .................................. 296/181.5; 296/180.4
(58) Field of Classification Search
CPC ..... B62D 35/001; B62D 33/08; B60J 7/1614; B60J 7/1291; Y10S 180/903
USPC .......... 296/26.01, 26.02, 26.04, 26.06, 26.07, 296/181.5, 181.7, 185.1, 100.17, 100.18, 296/99.1
See application file for complete search history.

(56) References Cited

U.S. PATENT DOCUMENTS

| 2,821,428 | A | * | 1/1958 | Webster | 296/26.05 |
| 4,269,444 | A | * | 5/1981 | Emory | 296/181.5 |
| 5,000,508 | A | * | 3/1991 | Woods | 296/180.5 |
| 6,286,894 | B1 | * | 9/2001 | Kingham | 296/181.5 |
| 7,118,165 | B2 | * | 10/2006 | Nelson et al. | 296/186.2 |
| 7,150,494 | B2 | | 12/2006 | Bangle et al. | |
| 2009/0102227 | A1 | | 4/2009 | Herndon | |
| 2010/0164249 | A1 | * | 7/2010 | Nusbaum | 296/180.4 |
| 2013/0181479 | A1 | * | 7/2013 | Smith | 296/181.5 |

FOREIGN PATENT DOCUMENTS

| DE | 19712648 A1 | 10/1998 |
| GB | 2098558 A | 11/1982 |
| GB | 2241205 A * | 8/1991 |
| GB | 2443035 A * | 4/2008 |
| WO | 2008125863 A1 | 10/2008 |

OTHER PUBLICATIONS

International Search Report (Feb. 3, 2011) for corresponding International Application PCT/IB2010/002152.

* cited by examiner

*Primary Examiner* — Jason S Morrow
*Assistant Examiner* — E Turner Hicks
(74) *Attorney, Agent, or Firm* — WRB-IP LLP

(57) ABSTRACT

A vehicle includes a cargo body having a roof that is deformable. The deformable roof can be placed in a neutral position, where the deformable roof forms substantially a flat surface parallel to a floor of the cargo body, or in at least one aerodynamic position, where at least a rear portion of the deformable roof is lowered with respect to the neutral position.

19 Claims, 5 Drawing Sheets

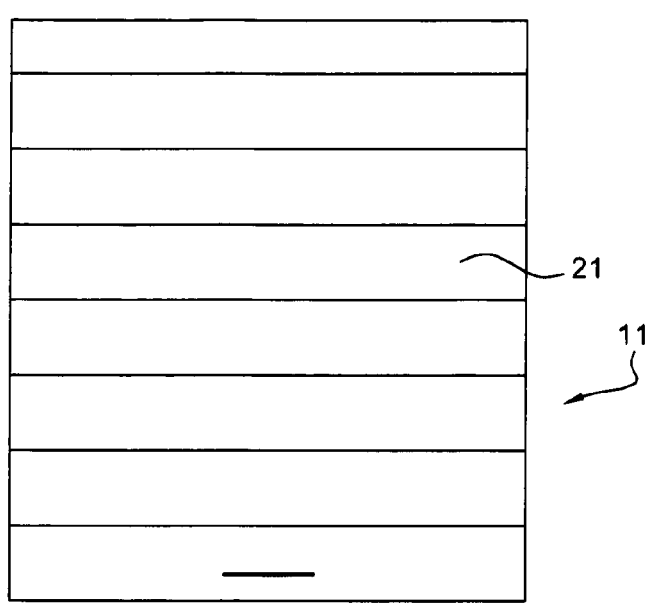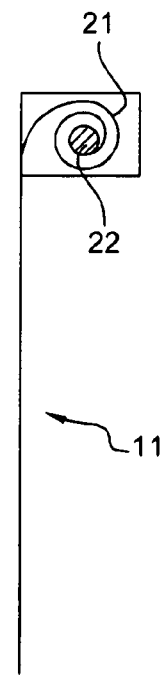
Fig. 10  Fig. 11
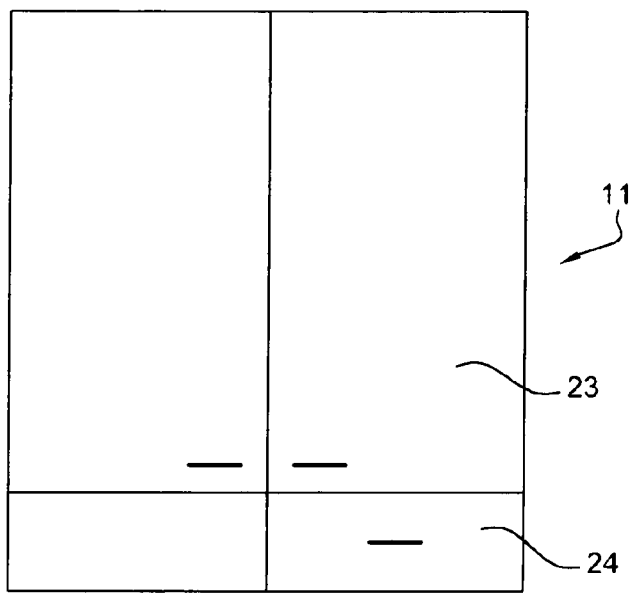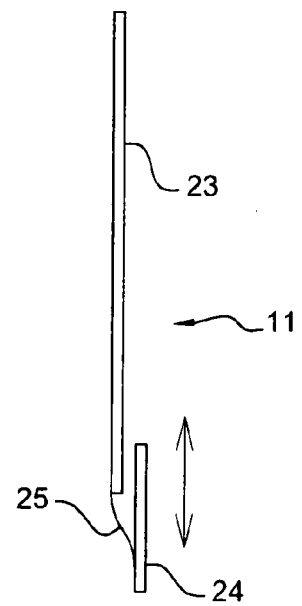
Fig. 12  Fig. 13

VEHICLE HAVING A DEFORMABLE ROOF FOR AERODYNAMICS IMPROVEMENT

BACKGROUND AND SUMMARY

The present invention relates to a vehicle for transporting goods, such as a trailer, a semi-trailer or a rigid. More particularly, the invention relates to such a vehicle having a deformable roof whose shape can be adapted in order to improve aerodynamics.

For many years, attempts have been made to improve vehicle efficiency. One factor in an efficient design is the aerodynamic characteristics of a vehicle. The air drag of a vehicle and especially of an industrial vehicle such as a truck is one of the factors that has a direct impact on fuel consumption. Therefore, in a general trend towards rare and expensive energy—whether fossil or not—, aerodynamics is one of the key issue in an efficient vehicle.

One problem with the current vehicles is that air flowing upwardly along the windshield then passes longitudinally rearward above the roof of the vehicle and tends to deviate outward from said roof. Such an air path is not favourable because it causes turbulence and, moreover, contributes to the creation of a low pressure area behind the vehicle. This increases the vehicle drag coefficient and, consequently, generates a high fuel consumption. It is estimated that the aerodynamic drag of a long haul truck entails a consumption of around 40%-60% of the engine power on a flat road at cruising speed.

Several devices have been added to vehicles in order to reduce turbulence, in particular to prevent air from deviating away from the vehicle roof. However, these devices don't make it possible to adapt the shape of the vehicle roof to improve aerodynamics depending on the current conditions. Moreover, many of these known devices can require specific, fragile and/or costly equipment.

It therefore appears that, from several standpoints, there is room for improvement in industrial vehicles aerodynamics.

It is desirable to provide an improved vehicle which can overcome the drawbacks encountered in conventional vehicles.

More particularly, it is desirable to provide a vehicle having a cargo body with a lower aerodynamic drag.

The invention relates, according to an aspect thereof, to a vehicle for transporting goods, such as a trailer, a semi-trailer or a rigid, said vehicle comprising a cargo body having a roof made being deformable.

According to an aspect of the invention, the deformable roof can be placed:
in a neutral position, where said deformable roof forms substantially a flat surface parallel to a floor of the cargo body,
or in at least one aerodynamic position, where at least a rear portion of the deformable roof is lowered with respect to the neutral position.

Thus, in a vehicle according to an aspect of the invention, it is possible to give the roof of the cargo body an aerodynamic shape. With such a shape, where the rear portion of the roof is lowered, the air passing above the roof is made to substantially follow said roof instead of deviating from it, which limits turbulence and aerodynamic drag.

Moreover, depending on the current conditions, the roof of the cargo body can be given a neutral shape, where generally the cargo body has the shape of a parallelepiped.

The roof is made of a deformable material, i.e. a material which has the appropriate mechanical strength to resist the stress it undergoes in use, but which can be elastically extended from the neutral position to the aerodynamic position or vice versa. For example, the roof can be made of a semi-rigid material or can comprise a flexible cover.

In a preferred embodiment, in the aerodynamic position, the deformable roof has a profile which progressively drops rearwards. Then, the roof shape is similar to the top surface of an airfoil profile, which is particularly efficient in terms of aerodynamics.

It can further be envisaged that, in at least one aerodynamic position, a front portion and/or a rear portion of the deformable roof is raised with respect to the neutral position. With a from part of the roof which is not a flat portion but a rising curved portion, while the rear part is lowered, the aerodynamics of the vehicle can be further improved.

Transition of the roof between a neutral and an aerodynamic position can be controlled manually or can be automatically controlled by control means.

In an advantageous implementation of an aspect of the invention, the roof position can be controlled as a function of the vehicle speed. This makes it possible to adapt the aerodynamic shape of the roof to the air flow passing above said roof, and therefore to further improve the overall aerodynamics.

There may also be provided on the vehicle external detection means in order to automatically cause the lowering of the deformable roof in case the aerodynamic position is higher than the neutral position and an external obstacle is detected.

The vehicle may further comprise internal detection means in order to automatically determine, the lowered position of the roof as a function of the load in the cargo body.

For example, the vehicle further comprises a plurality of supporting means which are arranged at intervals between a support surface of the cargo body and the deformable roof of the cargo body and which are capable of supporting said deformable roof, at least some of the supporting means being capable of placing said deformable roof in said neutral and aerodynamic positions.

In practice, each supporting means is capable of supporting an area of said deformable roof. In order to place said area of the deformable roof in the appropriate position, the supporting means can either be active means which are capable to pull or push the deformable roof, or passive means which support said deformable wall or do not when they are retracted, so that the deformable wall collapses.

The supporting means may also be capable of placing the corresponding area of the deformable wall in an appropriate intermediate position between the neutral position and the aerodynamic position.

The supporting means can be provided at least at the rear portion of the cargo body, for example at least at the rear third of the cargo body, so that at least the rear portion of the deformable roof can adopt an aerodynamic profile, which results in a reduced low pressure drag area behind the vehicle.

In an advantageous way, the supporting, means are provided substantially in the whole length of the cargo body, so that substantially the whole deformable roof can adopt an aerodynamic profile, which further improves the aerodynamics. In concrete terms, there are successive supporting means, and not continuously arranged supporting means.

For example, at least some of the supporting means are capable of lowering the rear portion of the deformable roof with respect to the neutral position, and/or at least some of the supporting means are capable of raising at least the front portion of the deformable roof with respect to the neutral position, so as to give the cargo body roof its aerodynamic shape.

The vehicle can further comprise means for actuating the supporting means between a neutral and an aerodynamic position, and said actuating means can be controlled manually or remotely controlled by control means. The supporting means can be actuated independently the one from the others or, alternatively, can be actuated simultaneously together.

For example, the supporting means are movable and/or extendable between a retracted position and a deployed position. For example, they can pivot about a transversal or longitudinal axis, and the angular position can be controlled as a function of the vehicle speed. In another implementation, the supporting means can comprise a hydraulic, pneumatic, electric or mechanical jack whose height can be controlled as a function of the vehicle speed.

According to an embodiment of an aspect of the invention, the cargo body comprises a container having a top wall forming the support suffice, and as flexible cover which is mounted onto the container, on the top wall, and which forms the deformable roof of the cargo body, wherein said flexible cover can be raised above the container top wall when the supporting means are in an aerodynamic position, and wherein said flexible cover can collapse to lie on the container top wall when the supporting means are in a neutral position. By providing a height adjustable additional upper wall, an aspect of the invention makes it possible to modify the roof shape without changing the cargo volume, to reduce the friction resistance.

The cargo body can comprise a container having a floor forming the support surface, and a top wall forming the deformable roof of the cargo body. For example, said top wall can be made of successive semi-rigid panels.

In this embodiment, the supporting means are capable of placing the container top wall in an aerodynamic position which is:
  either lower than the neutral position (preferably at the rear portion of the cargo body). In this case, the cargo volume is adapted to the charge by giving the rear part of the roof a lowered profile which makes it possible to reduce the pressure resistance;
  or higher than the neutral position (preferably at the front portion of the cargo body).

By providing a roof having both a lowered rear portion and a raised front portion, an aspect of the invention provides a vehicle with a cargo body having a roof intended to reduce both pressure and friction resistance.

In a vehicle having a flexible cover, the supporting means can comprise a plurality of substantially parallel members arranged transversally, respectively longitudinally, wherein said members can simultaneously pivot from a retracted position, where said members lie substantially parallel to the container top wall, and a deployed position, where said members stand at an angle with respect to the container top wall, the members having different heights depending on their longitudinal position, respectively having a variable height along their length, so that, when the members are in the deployed position, the flexible cover has an aerodynamic shape.

Said members for example comprise plates and/or bended tubes linked together by at least one pulling means such as a cable.

When the cargo body includes a container whose top wall forms said deformable roof, the supporting means can comprise a plurality of substantially vertical jacks which can be retracted or deployed in order to pull downwards or push upwards the deformable roof.

Besides, the cargo body preferably comprises a rear door and means for varying the rear door height to accommodate the variation in position of the deformable roof in the rear portion of the cargo body.

For example, the rear door comprises a flexible panel which can be wound as a roller. Alternatively, the rear door comprises a main panel and an additional panel which is slidably mounted on the main panel in the vertical direction.

These and other features and advantages will become apparent upon reading the following description in view of the drawing attached hereto representing, as non-limiting examples, embodiments of a vehicle according to an aspect of the invention.

BRIEF DESCRIPTION OF THE DRAWINGS

The following detailed description of several embodiments of the invention is better understood when read in conjunction with the appended drawings being understood, however, that the invention is not limited to the specific embodiments disclosed.

FIGS. 10 and 11 show a cargo body rear door according to a first embodiment, respectively from the rear and in a diagrammatic side view.

FIGS. 12 and 13 show a cargo body rear door according to a second embodiment, respectively from the rear and in a diagrammatic side view.

DETAILED DESCRIPTION

Figure 1:
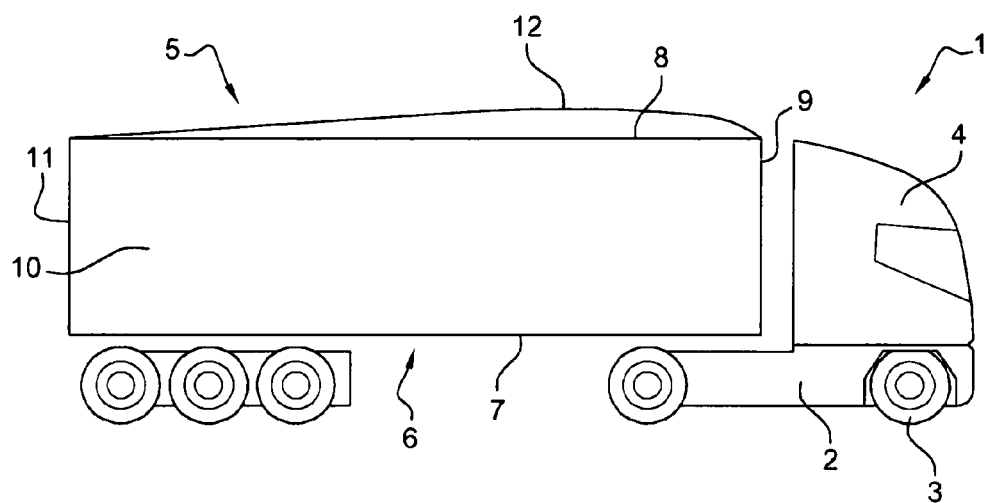
FIG. 1 is a diagrammatic side view of a first embodiment of a vehicle having an improved aerodynamic shape.

As this is illustrated in FIG. 1, a vehicle 1 comprises a frame 2 supported by wheels 3 as well as a cab 4 and a cargo body 5. In this embodiment, the vehicle is a tractor and semi-trailer combination, but the invention also concerns trailers or rigids (e.g. a vehicle with the cargo body, the engine, the transmission, the driveline and the driver cabin mounted on the same frame).

The cargo body 5 comprises a container 6 having a floor 7, a top wall 8, a front wall 9, side walls 10 and a rear door 11. Said container 6 substantially has the shape of a parallelepiped.

Reference is made to FIGS. 1-4 which illustrate a first embodiment of a vehicle having an improved aerodynamic shape.

In this embodiment, the cargo body 5 comprises a flexible cover 12 which is mounted onto the container 6, on the top wall 8, by any appropriate means such as fastening means arranged at the top wall periphery. For example, the flexible cover 12 can be made of textile, preferably of an elastic textile. Moreover, beaded tubes 13 are mounted on the container top wall 8 between said top wall 8 and the flexible cover 12. Said tubes 13 are oriented transversally and extend substantially from one side wall 10 to the other. The tubes 13 are arranged substantially in parallel relationship from the container front wall 9 over almost the entire length of the container 6, until the top wall rear edge.

Figure 3:
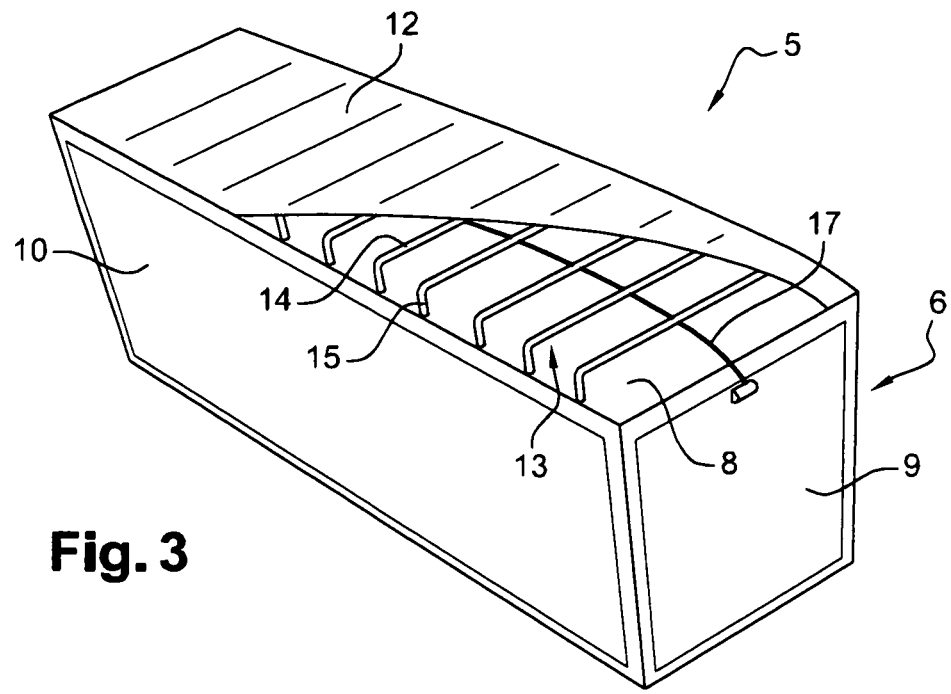
FIG. 3 is a diagrammatic perspective view of the cargo body of the vehicle of FIG. 2, the flexible cover being, partly cut away, FIG. 4 diagrammatically shows the supporting means of the vehicle of FIG. 2 as well as the actuating means causing their pivoting movement.
Figure 4:
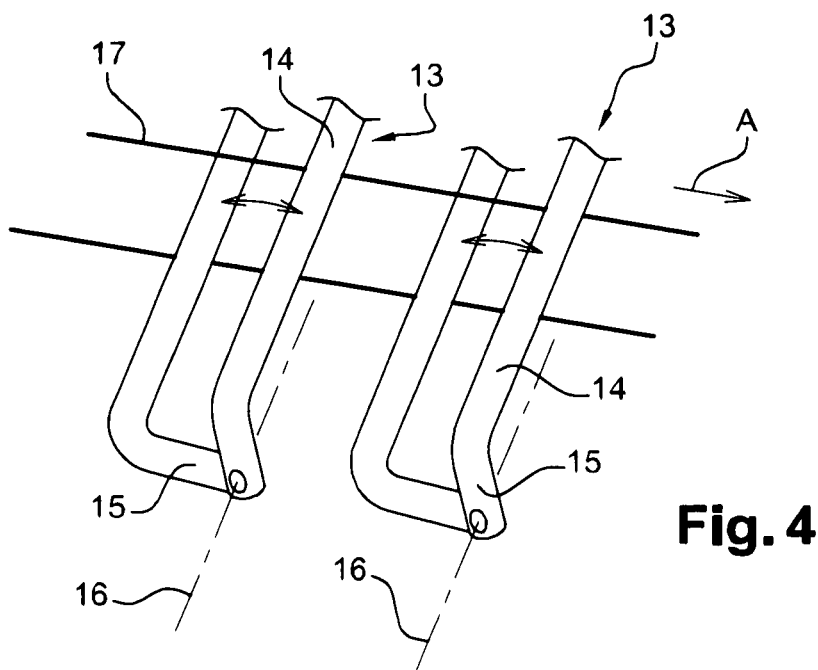

As shown in FIGS. 3 and 4, each tube 13 comprises a main transverse straight portion 14 and two end legs 15. Each tube 13 can pivot, with respect to the container top wall 8 and about a transverse axis 16 located at the lower part of the tube legs 15, from a retracted position or neutral position, where the legs 15 are substantially parallel to said top wall 8, to a deployed position or aerodynamic position, where the legs 15 are substantially orthogonal to said top wall 8. Said pivoting movement is caused by a longitudinal cable 17 which is linked to each tube 13 and simultaneously pulls the tubes 13 from their retracted position to their deployed position as shown by arrow A in FIG. 4. The cable 17 can be moved by an electrical motor or a hydraulic or pneumatic jack. The tubes 13 can be biased to their retracted position by springs or similar means (not shown). Alternatively, each support means could be independently actuated and controlled.

When the tubes 13 are in the retracted position, the flexible cover 12 lies onto the container top wall 8 due to its weight. When the tubes are in the deployed position, the flexible cover 12, supported by said tubes 13, is raised above the container top wall 8 and forms the cargo body roof.

Figure 2:
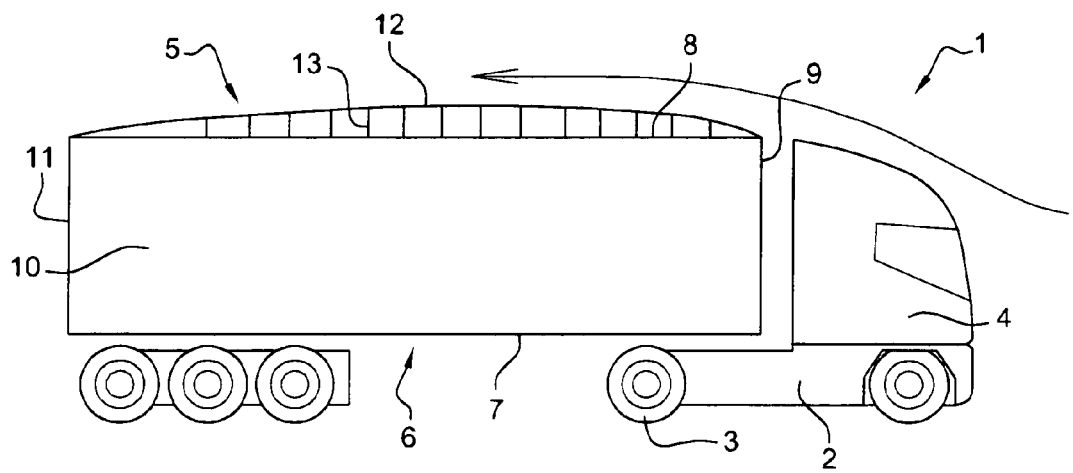
FIG. 2 is a diagrammatic side view of the vehicle of FIG. 1, showing supporting means and a flexible cover in an aerodynamic position.

As illustrated in FIG. 2, the tubes 13 may have different heights depending on their longitudinal position, i.e. legs 15 of different heights, which are appropriately chosen so that, when the tubes 13 are in the deployed position, the flexible cover 12 has a convex aerodynamic shape. In concrete terms, from the front wall 9 to the rear door 11 of the cargo body 5, the height of the tubes 13 first increases, then reaches a maximum around the first third of the cargo body length, and the progressively decreases. As a consequence, the flexible cover 12 supported by said tubes 13 has a shape similar to that of the upper face of an airfoil profile, i.e. a short rising curved front part and a remaining part that progressively drops rearwards until a height of zero. The same result could be achieved with a series of identical support means which, actuated and controlled independently, would be pivoted at different angles.

When the tubes 13 move from their deployed to their retracted position, the flexible cover 12, which is no longer supported by said tubes 13, collapses to lie on the container top wall 8. Preferably, the flexible cover is elastic or it is tensioned so as not to flap.

The cable 17, or any actuating means coupled to the tubes 13, is preferably remotely controlled either by the driver, or by control means which are designed to adapt the shape of the cargo body roof—here the flexible cover 12—for example as a function of the vehicle speed. As a result, said flexible cover 12 can have a shape, caused by the position of the tubes 13, which ensures a smooth air flow above the cargo body roof whatever the vehicle speed. To this purpose, there may be provided speed sensors which are operationally coupled to said control means. Alternatively, the shape of the roof could be adapted according to the type of road the vehicle is travelling (e.g. city road, country road or highway), which is an indirect image of the vehicle speed. Such information would be inferred from a navigation device including a positioning device.

Moreover, in a refined embodiment, there may be provided external obstacle detection means coupled to the control means in order to automatically release the cable 17, thereby causing the tubes 13 to move back to their retracted position and the flexible cover 12 to collapse. For example, the control means can be coupled to a GPS device including map data such as the location of bridges or tunnels. By causing the automatic collapse of the flexible cover 12, the invention makes it possible to prevent damages to this aerodynamic structure which stands above the conventional cargo body height.

Alternatively or in combination, other such detection means could include volumetric sensors, such as radars and/or vehicle to infrastructure communication means where the infrastructure could communicate to the vehicle the presence of such obstacles.

In this first embodiment, the container load volume is unchanged.

Figure 5:
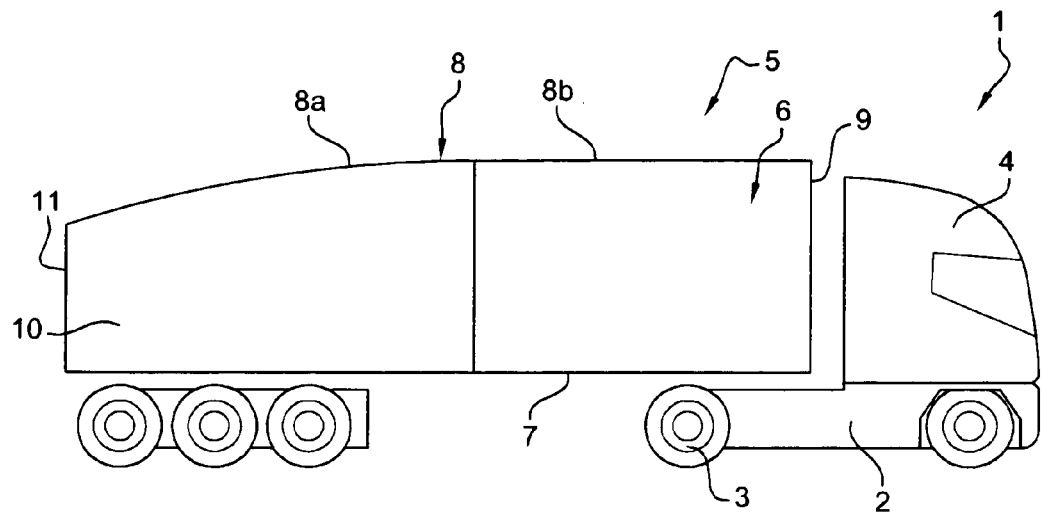
FIG. 5 is a diagrammatic side view of a second embodiment of a vehicle having an improved aerodynamic shape.
Figure 6:
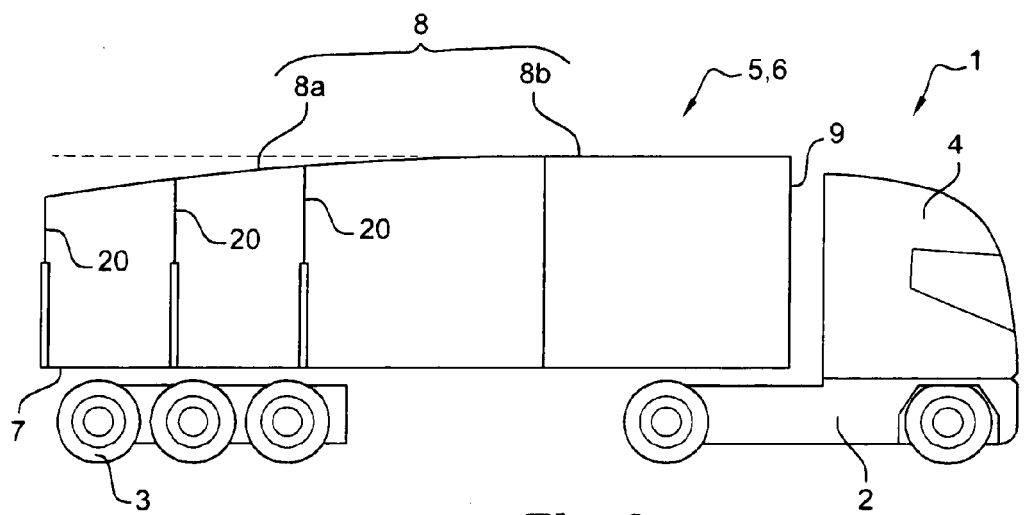
FIG. 6 is a diagrammatic side view of the vehicle of FIG. 5, showing supporting means and a deformable top wall in an aerodynamic position.

Reference is now made to FIGS. 5-6 which illustrate a second embodiment of a vehicle having an improved aerodynamic shape.

In this embodiment, the top wall 8 of the container 6 can be made of semi-rigid roof panels which are supported by vertical supports 20 such as jacks resting on the container floor 7 (on any other supporting surface linked to the chassis). Said vertical supports 20 can be extended between a retracted position and a deployed position by hydraulic, pneumatic, electric or mechanical actuating means. The jacks could also be otherwise movable with respect to the vehicle, for example pivotably connected to by the lower extremity to the support surface so as to better follow the movements the roof. In this embodiment, the vertical supports 20 are located only at the rear portion of the container 6, for example in the rear third portion of said container 6, whereas the remaining portion of the container 6 has a fixed top wall.

When the vertical supports 20 are in the deployed position, the rear portion 8a of the container top wall lies substantially in the same plan as the front portion 8b of the container top wall (see the dotted line in FIG. 6). The container 6 thus has the form of a parallelepiped. When possible—i.e. when the cargo volume is not fully used—the vertical supports 20 can be retracted. As a consequence, the rear portion 8a of the container top wall is lowered, either by being pulled downwards or simply because its supporting means are lowered. For example, the rear portion 8a can be lowered by 10-15 cm, or even 30 cm, along 2-3 m of the cargo body length.

As illustrated in FIG. 6, the height of the vertical supports 20, in the deployed position, is all the more low as the vertical support 20 is located close to the rear door 11. As a result, the rear portion 8a of the container top wall has a convex profile which progressively drops rearwards, which helps reducing the low pressure drag area behind the cargo body 5, and therefore improves aerodynamics. A concave profile could also be used.

In practice, most of the time and depending on the goods which are transported, the container volume is not fully used or empty. Therefore, this embodiment of the invention can often be implemented and offers a high potential for aerodynamics improvement. Furthermore, this embodiment constitute an easy, robust and rapid mechanism.

The vertical supports actuating means are preferably remotely controlled by control means which are designed to adapt the shape of the cargo body roof—here the container top wall 8—according to the load volume. If this adaptation of the roof shape is done automatically, there may be provided internal detection means, such as volumetric sensors or light barriers, in order to automatically determine the lowered position of thereof as a function of the load effectively contained in the cargo body. Said control means can also be designed to adapt said shape as a function of the vehicle speed, so as to ensure a smooth air flow above the cargo body roof whatever the vehicle speed.

It must be mentioned that the roof may have several pre-defined aerodynamic position, or even a continuous range of aerodynamic positions according, to effective load and/or according, to vehicle speed.

Figure 7:
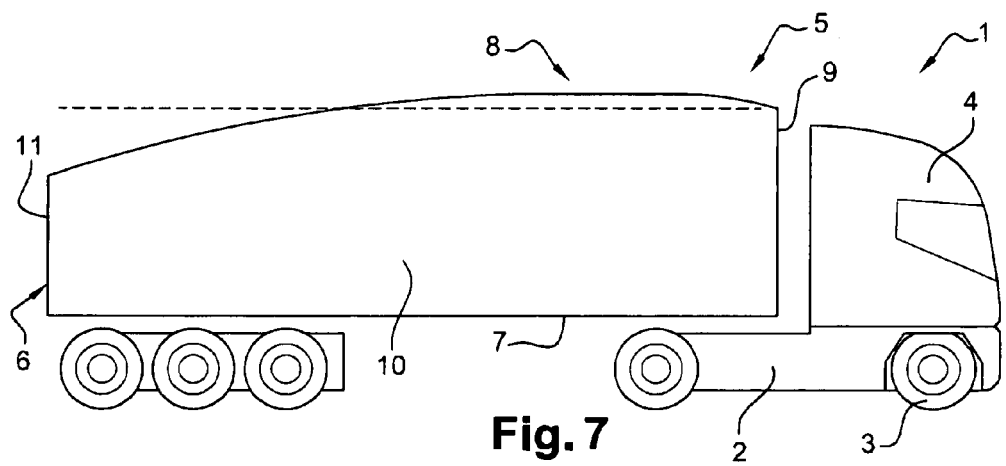
FIG. 7 is a diagrammatic side view of a third embodiment of a vehicle having an improved aerodynamic shape.
Figure 8:
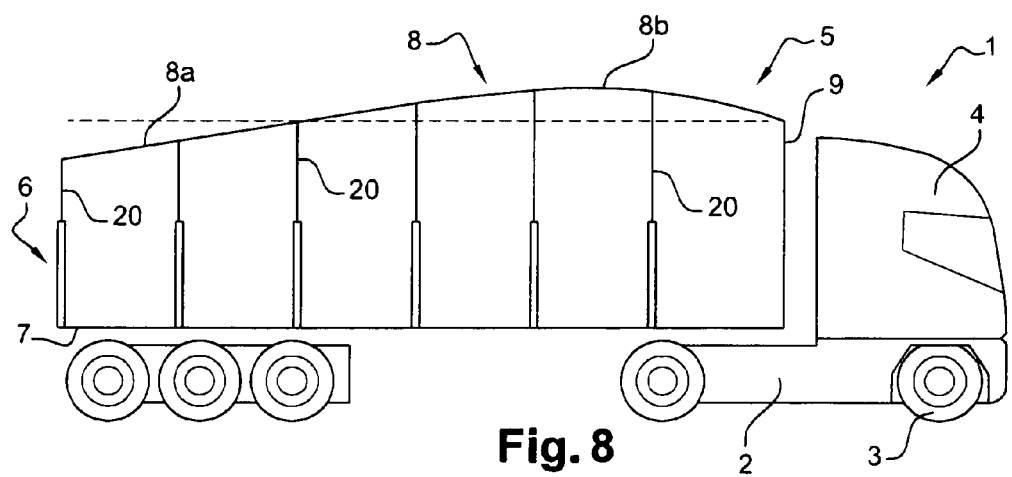
FIGS. 8 and 9 are diagrammatic side views of the vehicle of FIG. 7, showing supporting means and a deformable roof in an aerodynamic position, according to two possible variants of said third embodiment.
Figure 9:
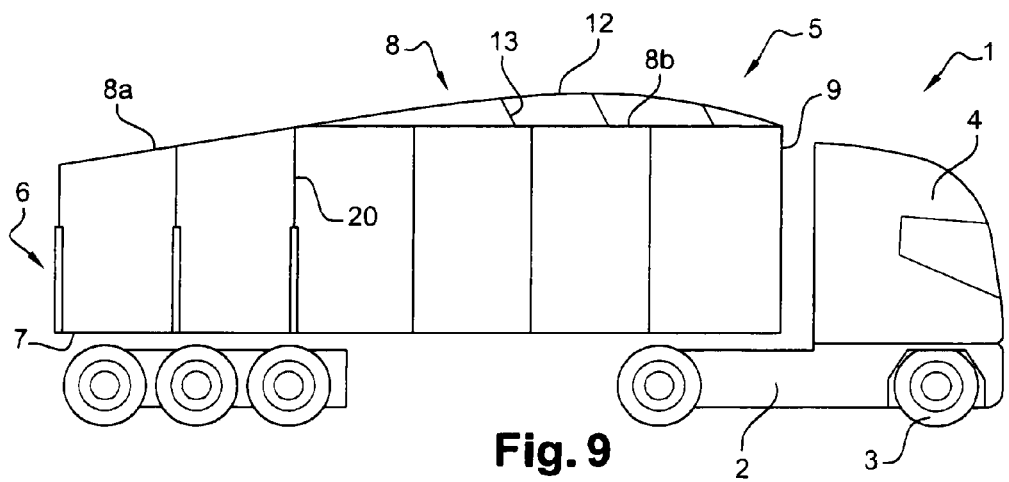

Reference is now made to FIGS. 7-9 which illustrate a third embodiment of a vehicle having an improved aerodynamic shape.

In this embodiment, as shown on FIG. 7, there are provided:
- at least on the rear part of the cargo body 5, supporting means which are capable of lowering the rear portion 8a of the deformable top wall with respect to the neutral position (see dotted line),
- and, on the front part and/or in a middle part of the cargo body 5, supporting, means which are capable of raising at least the front portion 8b of the deformable top wall with respect to the neutral position.

Therefore, this embodiment combines the advantages of the first two embodiments. It makes it possible to reduce the low pressure area behind the vehicle as well as to reach the best flow conditions above the cargo body roof i.e. to reduce turbulences, flow separation and aerodynamic friction resistance.

According to a first variant, illustrated in FIG. 8, there are provided vertical supports 20 substantially in the whole length of the container 6. Said vertical supports 20 rest on the floor 7 and support the top wall 8 of the container which can be made of semi-rigid panels.

According to a second variant, illustrated in FIG. 9, there are provided vertical supports 20 only at the rear part of the container 6 to support the rear portion 8a of the container top wall 8. Moreover, at the front part of the container 6 is provided a flexible cover 12 as well as the corresponding pivoting supporting members, such as the tubes 13 as previously disclosed.

In this third embodiment, the roof of the cargo body 5—that is to say either the top wall 8 of the container 6 or the flexible cover 12—can stand above the conventional cargo body height. Therefore, there are preferably provided obstacle detection means coupled to the control means, in order to automatically lower the roof of the cargo body 5 and prevent any damage to this aerodynamic structure.

With the second and third embodiments, an adaptation of the side walls of the container may be provided to enable lowering and/or raising of the top wall position. Such an adaptation can be easily obtained since many box shaped cargo bodies are curtain sided. On the other hand, the side walls could be rigid and remain unchanged whatever the position of the roof because they extend in a longitudinal plane and, in themselves, do not cause much longitudinal aerodynamic drag.

Moreover, an adaptation of the rear door may also be useful because of the vertical movement of the rear portion 8a of the container top wall. The cargo body therefore comprises means for varying the rear door height to accommodate the variation in position of the deformable roof in the rear portion of the cargo body.

According to a first embodiment, illustrated in FIGS. 10 and 11, the rear door 11 comprises a flexible panel or a series or articulated members 21 which can be wound as to roller, for example on a transversal shaft 22. Such type of roll-up or roll down doors are already commonly used on such vehicles.

According to a second embodiment, illustrated in FIGS. 12 and 11, the rear door comprises a main panel 23, for example the upper panel, and an additional panel 24, here the lower panel, which can both be rigid or flexible. The additional panel 24 is slidably mounted on the main panel 23 in the vertical direction, a seal 25 being provided between said panels 23, 24 to ensure a sealing effect for water and dust whatever the height of the rear portion 8a of the container top wall, i.e. the rear door height.

Of course, the invention is not restricted to the embodiment described above by way of non-limiting example, but on the contrary it encompasses all embodiments thereof.

In a most simple embodiment of the invention, the cargo body could comprise a roof where the front and middle portion of the roof are fixed, and where only the rear portion is deformable, either in the from of a flat rigid panel articulated to the front/middle portion at its front end, or in the form of a flexible panel, with in both cases only the rear edge of the rear roof portion being moveable downwards so that the rear portion can adopt an inclined position.

The invention claimed is:

1. A vehicle for transporting goods, the vehicle comprising a cargo body having a deformable roof attached to a lower portion of the cargo body, wherein the deformable roof is adapted to selectively be placed:
    in a neutral position, where the deformable roof forms substantially a flat surface parallel to a floor of the cargo body, or
    in at least one aerodynamic position, where at least a rear portion of the deformable roof is lowered with respect to the neutral position,
    at least one tube extending transversely across the cargo body and pivotable relative to the lower portion of the cargo body, wherein the at least one tube is adapted to lace the deformable roof in at least one aerodynamic position by pivoting the at least one tube relative to the lower portion of the cargo body so that a front portion and/or a middle portion of the deformable roof is raised with respect to the neutral position.

2. The vehicle according to claim 1, where, in the aerodynamic position, the deformable roof has a profile which progressively drops rearwards.

3. The vehicle according to claim 1, comprising control means for automatically controlling transition of the roof between the neutral and the at least one aerodynamic position.

4. The vehicle according to claim 3, wherein the control means controls the roof position as a function of the vehicle speed.

5. The vehicle according to claim 3, comprising external detection means for automatically lowering the deformable roof when the aerodynamic position is higher than the neutral position and an external obstacle is detected.

6. The vehicle according to claim 3, comprising internal detection means for automatically determining a position of the roof as a function of a load in the cargo body.

7. The vehicle according to claim 1, further comprising a plurality of vertical supports arranged at intervals between a support surface of the cargo body and the deformable roof of the cargo body and which support the deformable roof, at least some of the supports being adapted to place the deformable roof in the neutral and aerodynamic positions.

8. The vehicle according to claim 7, wherein the supports are provided at least at the rear portion of the cargo body.

9. The vehicle according to claim 7, wherein the supports are provided substantially along a whole length of the cargo body.

10. The vehicle according, to claim 7, wherein at least some of the supports are adapted to lower the rear portion of the deformable roof with respect to the neutral position.

11. The vehicle according to claim 7, wherein the supports are movable and/or extendable between a retracted position and a deployed position.

12. The vehicle according to claim 7, wherein the cargo body comprises a container having a top wall forming the support surface, and a flexible cover which is mounted onto the container, on the top wall, and which forms the deformable roof of the cargo body, wherein the flexible cover is adapted to be raised above the container top wall when the supports are in an aerodynamic position, and wherein the flexible cover is adapted to collapse to lie on the container top wall when the supports are in a neutral position.

13. The vehicle according to claim 7, wherein the cargo body comprises a container having a floor forming the support surface, and a top wall forming the deformable roof of the cargo body.

14. The vehicle according to claim 11, wherein the cargo body comprises a container having a top wall forming the support surface, and a flexible cover which is mounted onto the container, on the top wall, and which forms the deformable roof of the cargo body, wherein the flexible cover is adapted to be raised above the container top wall when the supports are in an aerodynamic position, and wherein flexible cover is adapted to collapse to lie on the container top wall when the supporting means are in a neutral position the supports comprise a plurality of substantially parallel members arranged transversally, respectively longitudinally, wherein the members are adapted to simultaneously pivot from a retracted position, where the members lie substantially parallel to the container top wall, and a deployed position, where the members stand at an angle with respect to the container top wall, the members having different heights depending on their longitudinal position, respectively having a variable height along their length, so that, when the members are in the deployed position, the flexible cover has an aerodynamic shape.

15. The vehicle according to claim 14, wherein the members comprise plates and/or bended tubes linked together by at least one means for pulling.

16. The vehicle according to claim 7, wherein the supports comprise a plurality of substantially vertical jacks which is adapted to be retracted or deployed in Order to pull downwards or push upwards the deformable roof.

17. The vehicle according to claim 7, wherein the cargo body comprises a rear door and means for varying the rear door height to accommodate the variation in position of the deformable roof in the rear portion of the cargo body.

18. The vehicle according to claim 17, wherein the rear door is adapted to be wound as a roller.

19. The vehicle according to claim 17, wherein the rear door comprises a main panel and an additional panel which is slidably mounted on the main panel in the vertical direction.

* * * * *